United States Patent [19]

Klauck et al.

[11] Patent Number: 5,512,655
[45] Date of Patent: Apr. 30, 1996

[54] DIHYDROXYFATTY ACIDS AS STRUCTURAL ELEMENTS FOR POLYURETHANES

[75] Inventors: Wolfgang Klauck, Meerbusch; Peter Daute, Essen, both of Germany

[73] Assignee: Henkel Kommanditgesellschaft auf Aktien, Duesseldorf, Germany

[21] Appl. No.: 157,179

[22] PCT Filed: Jun. 11, 1992

[86] PCT No.: PCT/EP92/01308

§ 371 Date: Dec. 7, 1993

§ 102(e) Date: Dec. 7, 1993

[87] PCT Pub. No.: WO93/00378

PCT Pub. Date: Jan. 7, 1993

[30] Foreign Application Priority Data

Jun. 20, 1991 [DE] Germany .................... 41 20 432.8

[51] Int. Cl.⁶ .................................................. C08G 18/36
[52] U.S. Cl. ............. 528/74.5; 528/71; 528/73; 524/591; 524/839; 524/840
[58] Field of Search .................. 524/591, 839, 524/840; 528/71, 73, 74.5

[56] References Cited

U.S. PATENT DOCUMENTS 4,551,517  11/1985  Herold et al. ............... 528/60
4,977,207  12/1990  Hoefer et al. .............. 524/507

FOREIGN PATENT DOCUMENTS

| 0018665 | 11/1980 | European Pat. Off. . |
| 0260499 | 9/1986 | European Pat. Off. . |
| 0260499 | 3/1988 | European Pat. Off. . |
| 0272524 | 6/1988 | European Pat. Off. . |
| 0278394 | 8/1988 | European Pat. Off. . |
| 0354471 | 2/1990 | European Pat. Off. . |
| 2804609 | 8/1979 | Germany . |
| 3246612 | 12/1982 | Germany . |
| 3318596 | 11/1984 | Germany . |
| 3347045 | 7/1985 | Germany . |
| 3507505 | 9/1986 | Germany . |
| 3827378 | 4/1989 | Germany . |
| 3903804 | 8/1990 | Germany . |
| 2104085 | 3/1983 | United Kingdom . |

Primary Examiner—James J. Seidleck
Assistant Examiner—John M. Cooney, Jr.
Attorney, Agent, or Firm—Wayne C. Jaeschke; John Daniel Wood; Daniel S. Ortiz

[57] ABSTRACT

A process for the production of carboxyfunctional polyurethane from dihydroxyfatty acids and/or dihydroxypolyfatty acids as isocyanate-reactive compounds bearing an ionizable group is provided. The dihydroxycarboxylic acids and/or dihydroxypolyfatty acids have no shielding molecular group near the carboxy group, more particularly not in the alpha-position to the carboxy group, and thus give particularly good results when used as a structural element for the production of polyurethanes. Also provided are polyurethanes and aqueous polyurethane dispersions produced using the dihydroxyfatty acids.

21 Claims, No Drawings

DIHYDROXYFATTY ACIDS AS STRUCTURAL ELEMENTS FOR POLYURETHANES

BACKGROUND OF THE INVENTION

1. Field of the Invention

This invention relates to the use of dihydroxyfatty acids and/or dihydroxypolyfatty acids as isocyanate-reactive compounds bearing an ionizable group for the production of carboxyfunctional polyurethanes. The invention also relates to polyurethanes produced using hydroxyfatty acids and to a process for their production.

2. Discussion of Related Art

The dihydroxyfatty acids suitable for use in accordance with the invention are known from DE-OS 33 18 596. It is known from DE-OS 35 07 505 that polyether polyesters based on the dihydroxyfatty acids mentioned can be used as a polyol component in the production of polyurethanes. In their case, however, the carboxylic acid function is esterified so that neither the polyol nor the polyurethane produced therefrom contains ionizable carboxy functions. Accordingly, the dihydroxyfatty acids are not reacted with the isocyanates as a free reactive component, but instead are used for the production of an intermediate product, namely the polyether polyester.

Dihydroxycarboxylic acids are generally known to the expert as suitable hydrophilic structural elements for polyurethanes from earlier applications filed by applicants, for example from DE-OS 38 27 378. When specified in detail, these hydroxycarboxylic acids have a relatively low carbon number, i.e. are not derived from natural fatty acids. In addition, it is pointed out that, of the dihydroxycarboxylic acids mentioned in the literature, those in which the carboxy group is sterically hindered by at least one part of the molecule in the alpha-position thereto are preferred or are the only dihydroxycarboxylic acids described in Examples. DE 28 04 609 mentions suitable hydroxycarboxylic acids and states that similar acids containing sterically hindered carboxy groups and free unhindered hydroxyl groups are also suitable. Sterically hydroxycarboxylic acids containing up to 12 carbon atoms in the alkyl radical are also mentioned in GB 2,104,085.

A dihydroxycarboxylic acid preferred in almost every relevant document is dimethylol propionic acid (DMPA) which is sterically hindered to a particularly high degree. The preference for DMPA would appear to be attributable to the fact that the steric hindrance of the carboxy group—caused by the methylol groups in the alpha-position—greatly reduces its tendency towards secondary reactions, i.e. crosslinking, in relation to a corresponding compound containing a sterically unhindered acid group. However, this does give rise to certain process-related disadvantages in the production of the polyurethanes. The main reason for these disadvantages is that DMPA is generally solid at the reaction temperature and, accordingly, has to be size-reduced beforehand and that the reaction can only take place at the liquid/solid interface, i.e. in a two-phase system. This generally leads to relatively long reaction times, to residues of unreacted DMPA and to the often undesirable fact that a large part of the DMPA introduced only reacts after the hydroxyfunctional compounds have reacted off in the liquid phase, so that the carboxy groups are not uniformly distributed throughout the polyurethane skeleton. In addition, the hard segment character of DMPA—due to the relatively small size of the molecule coupled with high functionality—causes a relatively high viscosity of the polyurethane polymers or prepolymers and can also have an adverse effect on their performance properties, such as their resistance to water.

DESCRIPTION OF THE INVENTION

The problem addressed by the present invention was to provide structural elements for polyurethanes which would perform the same function as the hitherto known hydroxycarboxylic acids without at the same time being attended by any of their disadvantages. In addition, these structural elements would be obtainable from natural raw materials. In addition, the property profile of polyurethanes and the production of the polyurethanes would be improved by the use of these structural elements in accordance with the invention.

The problem stated above has been solved by the use of dihydroxyfatty acids and/or dihydroxypolyfatty acids as isocyanate-reactive compounds bearing an ionizable group for the production of carboxyfunctional polyurethanes.

In the light of the prior art which, in the final analysis, must be regarded as teaching that a hydroxycarboxylic acid is more suitable, the better the carboxylic acid group is shielded or sterically hindered by at least one and, better yet, two adjacent molecule groups, it must be regarded as all the more surprising to the expert that it has now been found that dihydroxycarboxylic acids with no shielding molecular group near the carboxy group, more particularly not in the alpha-position to the carboxy group, give particularly good results when used as a structural element for the production of polyurethanes.

As already mentioned, the dihydroxycarboxylic acids suitable for use in accordance with the invention and their production are described in DE-OS 33 18 596 to which reference is hereby specifically made.

The dihydroxyfatty acids suitable for use in accordance with the invention may be produced by epoxidizing esters of unsaturated fatty acids, ring-opening and optionally transesterifying the epoxides with an excess of an aliphatic diol and/or water in the presence of an acid as catalyst, adding alkali metal hydroxides to the reaction mixtures at temperatures of 20° C. to 60° C. and then saponifying the reaction mixtures at temperatures of 80° C. to 110° C. to form the dihydroxyfatty acids. If the aliphatic diols and/or water are used in a stoichiometric quantity or in less than the stoichiometric quantity in the ring opening of the epoxides, crosslinking reactions also take place with formation of dihydroxypolyfatty acids which also count as dihydroxyfatty acids in the context of the present invention.

The dihydroxyfatty acids according to the invention are preferably derived from naturally occurring fatty acids. Accordingly, they generally contain an even number of carbon atoms in the main chain and are not branched. Those having a chain length of $C_{14}$ to $C_{26}$ are particularly suitable. Natural fatty acids are generally used in the form of technical mixtures for industrial applications. These mixtures preferably contain a predominant quantity of oleic acid. In addition, they may contain other saturated, monounsaturated and polyunsaturated fatty acids. In principle, mixtures of different chain length, which may also contain saturated components or dihydroxyalkoxycarboxylic acids with double bonds, may also be used in the production of the dihydroxyfatty acids or dihydroxyalkoxyfatty acids suitable for use in accordance with the invention. Accordingly, not only the pure dihydroxyfatty acids, but also mixed products obtained from animal fats or vegetable oils, which contain >40% and preferably >60% monounsaturated fatty acids after working up (ester cleavage, purification stages), are suitable for this purpose. Examples of such products are commercially obtainable, natural raw materials such as, for example, beef tallow with a chain distribution of 67% oleic acid, 2% stearic acid, 1% heptadecanoic acid, 10% saturated $C_{12-16}$ fatty acids, 12% linoleic acid and 2% saturated $>C_{18}$ fatty acids or, for example, the oil of new sunflowers (NSf) with a composition of approx. 80% oleic acid, 5% stearic acid, 8% linoleic acid and approx. 7% palmitic acid. These products may be briefly distilled after ring opening to reduce the unsaturated fatty acid ester components. Further purification steps (for example longer distillation) are also possible.

The dihydroxyfatty acids according to the invention are preferably derived from monounsaturated fatty acids. Thus, 9,10-dihydroxypalmitic acid, 9,10-dihydroxystearic acid and 13,14-dihydroxybehenic acid and 10,9- or 14,13-isomers thereof are preferred products for the purposes of the invention. Also preferred are monounsaturated fatty acids which, after epoxidation, may be ring-opened and subsequently hydrolyzed with water or dialcohols (diols), for example via the methyl ester stage, such as 4,5-tetradecenoic acid, 9,10-tetradecenoic acid, 9,10-pentadecenoic acid, 9,10-hexadecenoic acid, 9,10-heptadecenoic acid, 6,7-octadecenoic acid, 9,10-octadecenoic acid, 11,12-octadecenoic acid, 11,12-eicosenoic acid, 11,12-docosenoic acid, 13,14-docosenoic acid, 15,16-tetracosenoic acid and 9,10-ximenic acid. Oleic acid (9,10-octadecenoic acid) is preferred. Both cis- and trans-isomers of all the fatty acids mentioned are suitable.

Other suitable dihydroxyfatty acid are those derived from less commonly encountered fatty acids, such as decyl-12-enic acid, stillingia acid, dodecyl-9-enic acid, ricinoleic acid, petroselic acid, vaccenic acid, elaeostearic acid, punicic acid, licanic acid, parinaric acid, gadoleic acid, arachidonic acid, 5-eicosenoic acid, 5-docosenoic acid, cetoleic acid, 5,13-docosadienoic acid and/or selacholeic acid.

Dihydroxyfatty acids produced from isomerization products of natural unsaturated fatty acids are also suitable. The dihydroxyfatty acids thus produced differ only in the position of the hydroxy or hydroxyalkoxy groups in the molecule. They are generally present as mixtures.

Although naturally occurring fatty acids as natural raw materials are a preferred starting component for the purposes of the invention, this does not mean that synthetically produced carboxylic acids with corresponding carbon numbers cannot be used. In the context of the invention, fatty acids are understood to be carboxylic acids containing between 8 an 36 carbon atoms, irrespective of their production.

The hydroxyalkoxy radical of the dihydroxyfatty acids is derived from the diol which was used for ring opening of the epoxidized fatty acid derivative. Dihydroxyfatty acids of which the hydroxyalkoxy group is derived from preferably primary dihydric alcohols containing up to 6 carbon atoms are preferred. Suitable diols are propanediol, butanediol, pentanediol and hexanediol, preferably ethane-1,2-diol, butane-1,4-diol and/or hexane-1,6-diol.

In addition, polyethylene glycol, polypropylene glycol and/or polytetrahydrofurandiol and copolymerization or graft polymerization products thereof are particularly suitable for use as the diol compounds. This applies in particular when the compounds in question have a degree of polymerization of about 2 to 20 units.

To produce the dihydroxyfatty acids according to the invention, epoxidized carboxylic acid esters, for example epoxidized fatty acid methyl, ethyl, propyl or glycerol ester, may be reacted with water and/or the diols from which the hydroxyalkyl group is to be derived under ring opening and, if desired, transesterification conditions. Known processes may be used for this purpose. It is preferred initially to introduce the diol and/or water to be reacted together with an acidic catalyst, for example a strong mineral acid, and then to add the epoxidized fatty acid derivative continuously or in portions at a reaction temperature of 80° C. to 120° C. The progress of the reaction can be monitored by titration of the residual epoxide content or by spectroscopic methods. When the epoxide groups have reacted, the acidic catalyst is destroyed by neutralization. The dihydroxyfatty acids thus formed may optionally be freed from excess alcohol by distillation.

The saponification of the dihydroxyfatty acid esters to the dihydroxyfatty acids is then normally carried out in a second stage. The saponification is preferably carried out at temperatures in the range from 40° C. to 120° C. in the presence of water using a base as catalyst. Suitable bases are the hydroxides of the alkali and/or alkaline earth metals and also tertiary amines. The dihydroxyfatty acids accumulate as salts (soaps) after this reaction stage and may be recovered by addition of strong acids, for example hydrochloric acid or sulfuric acid. The reaction products may be purified by washing with water one or, if desired, more times. In principle, the esters and, in particular, the triglycerides may also be subjected to pressure hydrolysis with water in the absence of catalysts.

In the context of the invention, dihydroxyfatty acids are understood to be both the ring opening products of epoxidized unsaturated fatty acids with water and also the corresponding ring opening products with diols and crosslinking products thereof with further epoxide molecules. The ring opening products with diols may also be referred to somewhat more correctly as dihydroxyalkoxyfatty acids. The hydroxy groups or the hydroxyalkoxy group are/is preferably separated from the carboxy group by at least 1, preferably at least 3 and, more preferably, at least 6 $CH_2$ units. The ring opening products mentioned are eminently suitable for use in the production of water-dispersible polyurethanes.

The present invention also relates to polyurethanes containing ionizable carboxy functions obtainable by reaction of a) on average polyfunctional isocyanates with b) on average polyfunctional polyols and c) a component introducing ionizable carboxy functions and d) if desired, a chain-extending agent.

According to the invention, these polyurethanes are characterized in that c) is a dihydroxyfatty acid. Preferred embodiments of the polyurethanes according to the invention include the above-mentioned preferred embodiments of suitable dihydroxyfatty acids.

The percentage content of c) is preferably gauged according to the quantity and hydrophilic properties of the other components in such a way that the polyurethanes formed are self-dispersible in water. It is not possible to give exact figures. If, for example, polyols— which themselves introduce a relatively high degree of hydrophilicity—are used as starting component, it will not be necessary to use such a large quantity of component c) as when substantially hydrophobic polyols are used as starting component in order to obtain self-dispersible polyurethanes. Accordingly, the particular quantity of c) required can only be stated via the "self-dispersible" function. However, the expert on polyurethane dispersions will be able from his knowledge and experience to estimate the necessary quantity of c) and/or to determine it exactly by a few tests, the type and quantity of other components having been determined in advance. Polyurethane dispersions are preferably prepared from the self-dispersible polyurethanes. The polyurethane dispersions generally have a solids content of 20 to 70% by weight and, more particularly, 30 to 50% by weight.

Several different polyol compounds may be used individually or in admixture as the polyol component b). Generally speaking, these polyols must have at least two isocyanate-reactive hydrogen atoms and should be substantially linear. Suitable polyols such as these are, for example, polyethers, polyacetals, polycarbonates, polythioethers, polyamides, polyester amides and/or polyesters which on average contain two to at most four reactive hydrogen atoms.

In the context of the invention, polycarbonates are understood to be polyesters which, theoretically, may be prepared by esterification of carbonic acid with dihydric or polyhydric alcohols and which have one hydroxyl group at either end of the chain. The alcohols and, hence, the polycarbonate diols preferably have an aliphatic structure. Suitable polyhydric alcohols are, for example, trihydric alcohols, such as glycerol for example. However, it is preferred to use dihydric alcohols, particularly if they contain no less than four and no more than ten carbon atoms. Although cyclic and branched alcohols are suitable, linear alcohols are preferred. The hydroxyl groups may be adjacent, for example in the 1,2-position, or even isolated. OH-terminated diols are preferred.

Suitable polyethers are, for example, the polymerization products of ethylene oxide, propylene oxide and butylene oxide and copolymerization or graft polymerization products thereof and also the polyethers obtained by condensation of polyhydric alcohols or mixtures thereof and the polyethers obtained by alkoxylation of polyhydric alcohols, amines, polyamines and aminoalcohols. Other suitable polyethers are the polytetrahydrofurans described in EP 354 471 and also ethylene glycol-terminated polypropylene glycols.

Suitable polyacetals are, for example, the compounds obtainable from glycols, such as diethylene glycol, triethylene glycol, hexanediol and formaldehyde. Suitable polyacetals may also be prepared by polymerization of cyclic acetals.

Among the polythioethers, the condensation products of thiodiglycol on its own and/or with other glycols, dicarboxylic acids, formaldehyde, aminocarboxylic acids or amino alcohols are mentioned in particular. Depending on the co-components, the products in question are polythioethers, polythio mixed ethers, polythioether esters, polythioether ester amides. Polyhydroxy compounds such as these may also be used in alkylated form or in admixture with alkylating agents.

The polyesters, polyester amides and polyamides include the predominantly linear condensates (for example polyterephthalates) obtained from polybasic saturated and unsaturated carboxylic acids or anhydrides thereof and polyhydric saturated and unsaturated alcohols, amino alcohols, diamines, polyamines and mixtures thereof. Polyesters of lactones, for example caprolactone, or of hydroxycarboxylic acids may also be used. Relatively high molecular weight polymers or condensates such as, for example, polyethers, polyacetals, polyoxymethylenes may also be used as alcohol (co)component for the production of the polyesters.

Polyhydroxyl compounds already containing urethane or urea groups and optionally modified natural polyols, such as castor oil, may also be used. Basically, polyhydroxyl compounds containing basic nitrogen atoms, for example polyalkoxylated primary amines, or polyesters or polythioethers containing co-condensed alkyl diethanolamine may also be used. Polyols obtained by complete or partial ring opening of epoxidized triglycerides with primary or secondary hydroxyl compounds, for example the reaction product of epoxidized soybean oil with methanol, are also suitable. Copolymers of the polyhydroxyl compounds mentioned and analogs thereof preferably terminated by amino or sulfide groups may also be used.

In general, polyol components based at least predominantly on natural polyols are also particularly suitable. In the context of the invention, natural polyols are, in particular, castor compounds, such as castor oil for example. Modified triglycerides of the type described, for example, in DE 32 46 612 are particularly suitable natural polyols. They may be prepared by partial ring opening of epoxidized triglycerides of a fatty acid mixture containing at least partly olefinically unsaturated fatty acids with monohydric or polyhydric alcohols. The epoxidized carboxylic acid esters preferably used in this connection include in particular the triglycerides of epoxidized naturally occurring fatty acids, such as epoxidized soybean oil, more particularly with an epoxide oxygen content of 5.8 to 6.8% by weight, epoxidized sunflower oil rich and/or poor in oleic acid, preferably with an epoxide oxygen content of 4.4 to 6.6% by weight, epoxidized linseed oil, preferably with an epoxide oxygen content of 8.2 to 8.6% by weight, and epoxidized train oil, preferably with an epoxide oxygen content of 6.3 to 6.7% by weight.

Suitable starting materials for epoxidized carboxylic acid esters for the production of natural polyols are any of numerous vegetable and/or animal triglycerides, such as beef tallow, palm oil, coconut oil, peanut oil, rapeseed oil, cottonseed oil, soybean oil, train oil, sunflower oil, coriander oil and/or linseed oil. Equally suitable are epoxidized carboxylic acid esters of monohydric alcohols with naturally occurring epoxidized fatty acids of the type obtainable, for example, by transesterification of the epoxidized triglycerides mentioned above with monohydric alcohols which may also be used for ring opening and which are described hereinafter.

The epoxidized compounds mentioned above may be ring-opened with alcohols and/or carboxylic acids. In principle, saturated, unsaturated, branched, unbranched, cyclic, aromatic monohydric primary alcohols may be used for ring opening. Of these, saturated, unbranched, monohydric primary alcohols containing 1 to 22 carbon atoms, preferably 8 carbon atoms and, more particularly, up to 4 carbon atoms, such as methanol, ethanol, propanol and/or butanol, are particularly preferred. Diols of which one hydroxyl group is etherified or esterified, such as monoalkyl ethylene glycol, may also be used as the monohydric primary alcohols. Ring opening products of the epoxidized compounds mentioned above with dihydric, trihydric and/or polyhydric alcohols, such as ethylene glycol, propylene glycol, propanediol, butanediol, hexanediol, trimethylol propane, glycerol, trimethylol ethers, pentaerythritol and/or sorbitol, and with condensation products, such as diglycerol, polyglycerol, polytrimethylol propane polyethylene glycol, polypropylene glycol, and polytetrahydrofurandiol, particularly those last three glycols with a degree of polymerization of 2 to 20 units in each case Any polyfunctional aromatic and aliphatic isocyanates may be used as the isocyanate component a). Suitable polyfunctional isocyanates preferably contain on average 2 to at most 4 NCO groups. Examples of suitable isocyanates are 1,5-naphthylene diisocyanate, 4,4'-diphenyl methane diisocyanate (MDI), hydrogenated MDI ($H_{12}$MDI), xylylene diisocyanate (XDI), tetramethyl xylylene diisocyanate (TMXDI), 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate (TDI), optionally in admixture, 1-methyl-2,4-diisocyanato-cyclohexane, 1,6-diisocyanato- 2,2,4-trimethyl hexane, 1,6-diisocyanato 2,4,4-trimethylhexane, 1-isocyanatomethyl-3-isocyanato- 1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, 1,4-butane diisocyanate, 1,6-hexane diisocyanate (HDI), dicyclohexyl methane diisocyanate, cyclohexane-1,4-diisocyanate, ethylene diisocyanate, phthalic acid bis-isocyanatoethyl ester; polyisocyanates containing reactive halogen atoms, such as 1-chloromethylphenyl-2,4-diisocyanate, 1 -bromomethylphenyl-2,6-diisocyanate, 3,3-bis-chloromethylether- 4,4'-diphenyl diisocyanate. Sulfur-containing polyisocyanates are obtained, for example, by reaction of 2 mol hexamethylene diisocyanate with 1 mol thiodiglycol or dihydroxydihexyl sulfide. Other important diisocyanates are trimethyl hexamethylene diisocyanate, 1,4-diisocyanatobutane, 1,2-diisocyanatododecane and dimer fatty acid diisocyanate. Partly capped polyisocyanates which provide for the formation of self-crosslinking polyurethanes, for example dimeric tolylene diisocyanate, or polyisocyanates partly reacted with, for example, phenols, tertiary butanol, phthalimide, caprolactam, are also of interest.

In one particular embodiment, the isocyanate component partly contains dimer fatty acid isocyanate. Dimer fatty acid in the context of the invention is a mixture of predominantly $C_{36}$ dicarboxylic acids which is obtained by the thermal or catalytic dimerization of unsaturated $C_{18}$ monocarboxylic acids, such as oleic acid, tall oil fatty acid or linoleic acid. Dimeric fatty acids have long been known to the expert and are commercially available. The dimer fatty acid may be reacted to form dimer fatty acid isocyanates. Technical dimer fatty acid diisocyanate contains on average at least two and less than three isocyanate groups per molecule dimer fatty acid. Preferably more than 30% by weight and, in particular, most of the isocyanate component a) and more preferably the entire isocyanate component a) consists of aliphatic isocyanates. The generally unwanted secondary reaction of carboxy groups with isocyanate groups can be almost completely suppressed by the (co)use of aliphatic isocyanates. In addition, a controlled reaction, for example, is possible where chain extension is carried out in water.

Suitable chain-extending agents d) containing reactive hydrogen atoms include:

the usual saturated and unsaturated glycols, such as ethylene glycol or condensates or ethylene glycol, butane-1,3-diol, butane-1,4-diol, butenediol, propane-1,2-diol, propane-1,3-diol, neopentyl glycol, hexanediol, bis-hydroxymethyl cyclohexane, dioxyethoxyhydroquinone, terephthalic acid bis-glycol ester, succinic acid di-2-hydroxyethyl amide, succinic acid di-N-methyl-(2-hydroxyethyl)-amide, 1,4-di-(2-hydroxymethymercapto)- 2,3,5,6-tetrachlorobenzene, 2-methylenepropane- 1,3-diol, 2-methylpropane-1,3-diol; aliphatic, cycloaliphatic and aromatic diamines, such as ethylenediamine, hexamethylenediamine, 1,4-cyclohexylenediamine, piperazine, N-methyl propylenediamine, diaminodiphenyl sulfone, diaminodiphenyl ether, diaminodiphenyl dimethyl methane, 2,4-diamino-6-phenyl triazine, isophoronediamine, dimer fatty acid diamine, hydrazine, diaminodiphenyl methane or the isomers of phenylenediamine; also carbohydrazides or hydrazides of dicarboxylic acids;

amino alcohols, such as ethanolamine, propanolamine, butanolamine, N-methyl ethanolamine, N-methyl isopropanolamine;

aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the isomeric mono- and diaminonaphthoic acids;

water.

It is emphasized that a strict distinction cannot be made between the compounds containing reactive hydrogen atoms as polyol component and the so-called "chain-extending agents" because the transitions between both classes of compounds are fluid. Compounds which are not made up of several monomer units, but which have a relatively high molecular weight, such as 3,3'-di-bromo- 4,4'-diaminodiphenyl methane for example, are counted as chain-extending agents, as is pentaethylene glycol although, on the basis of its composition, it is actually a polyetherdiol.

Special chain-extending agents containing at least one basic nitrogen atom are, for example, mono-, bis- or polyalkoxylated aliphatic, cycloaliphatic, aromatic or heterocyclic primary amines, such as N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, N-cyclohexyl diisopropanolamine, N,N-diethoxylaniline, N,N-diethoxyltoluidine, N,N-diethoxyl-1-aminopyridine, N,N'-diethoxylpiperazine, dimethylbis-ethoxylhydrazine, N,N'-bis-(2-hydroxyethyl)-N,N'-diethylhexahydro-p-phenylenediamine, N-12-hydroxyethyl piperazine, polyalkoxylated amines, such as propoxylated methyl diethanoiamine; also such compounds as N-methyl-N,N-bis-3-aminopropylamine, N-(3-aminopropyl)-N,N'-dimethyl ethylenediamine, N-(3-aminopropyl)-N-methyl ethanolamine, N,N'-bis-( 3-aminopropyl)-N,N'-dimethylethylenediamine, N,N'-bis-( 3-aminopropyl)-piperazine, N-(2-aminoethyl)-piperazine, N,N'-bisethoxylpropylenediamine, 2,6-diaminopyridine, diethanolaminoacetamide, diethanolamidopropionamide, N,N-bis-ethoxylphenyl thiosemicarbazide, N,N-bisethoxylmethyl semicarbazide, p,p'-bis-aminomethyl dibenzyl methylamine, 2,6-diaminopyridine, 2-dimethylaminomethyl- 2-methylpropane-1,3-diol.

Chain-extending agents containing quaternizable halogen atoms or R—$SO_2O$ groups are, for example, glycerol-1-chlorohydrin, glycerol monotosylate, pentaerythritol bis-benzenesulfonate, glycerol monomethane sulfonate, adducts of diethanolamine and chloromethylated aromatic isocyanates or aliphatic haloisocyanates, such as N,N-bis-hydroxyethyl-N'-m-chloromethylphenyl urea, N-hydroxyethyl-N'-chlorohexyl urea, glycerol monochloroethyl urethane, bromoacetyl dipropylenetriamine, chloroacetic acid diethanolamide. Particularly suitable chain-extending agents are short-chain isocyanate-reactive diamines and/or dihydroxy compounds.

The present invention also relates to a process for the production of the polyurethanes claimed in claims 9 to 12, characterized in that components b) and c) are processed to form a homogeneous single-phase system before the reaction with a). In contrast to DMPA which, hitherto, has mostly been preferred in the relevant literature, the dihydroxyfatty acids suitable for use in accordance with the invention have the advantage that they are liquid at room temperature. In addition, they may be incorporated fully homogeneously in the polyol so that the isocyanate-reactive component is present as a single-phase system. This in turn provides for shorter reaction times and for negligible residues of unreacted dihydroxyfatty acid. In addition, the dihydroxyfatty acids react with the other reactive components in such a way that they are homogeneously distributed throughout the polyurethane skeleton formed. Because the dihydroxyfatty acids do not have a pronounced hard segment character, the polyurethane polymers or prepolymers produced are less viscous than comparable polymers containing DMPA. If the polyurethanes are self-dispersing in water, as in the preferred embodiment, the dispersions can be made into films which show greater resistance to water where dihydroxyfatty acids as opposed to DMPA are used in the production of the polyurethanes.

The polyurethanes according to the invention may be used for various applications. For example, they may be used in two-component systems, thixotropic pastes or even in moisture-curing adhesives and sealants. Their adhesion to metals is particularly worth emphasizing. In addition, the polyurethanes according to the invention may also be injection-molded or extruded to form moulded articles. The self-dispersible polyurethanes according to the invention are preferably used for the production of aqueous polyurethane dispersions which in turn may be used, optionally in admixture with other auxiliaries, as adhesive, sealing and/or coating compounds.

The invention is illustrated by the following Examples.

EXAMPLES

Example 1

Ring opening of epoxystearic acid methyl ester (technical) with ethylene glycol and release of the carboxylic acid 100 kg epoxystearic acid methyl ester (Ep.O= 4.95%) and 38.3 kg ethylene glycol were heated with stirring to 90° C. in the presence of 34 g concentrated sulfuric acid. The initially exothermic reaction was terminated after 1.5 hours (Ep.O=0.03%). The catalyst acid was neutralized with 160 g 30% methanolic sodium methylate solution and the crude product was distilled in vacuo up to 200° C. (27.7 kg distillate). A clear yellow liquid was obtained in this way. (OHV [OH value] =235, SV [saponification value]=162, IV [iodine value]=7, AV [acid value]=0.7).

2243.2 g of the ring opening product of epoxystearic acid methyl ester with glycol were saponified with 1430 g 20% sodium hydroxide at 90° C. (reaction time 3 h). 1002.4 g 20% sulfuric acid were then added at 60° C. and the organic phase was washed twice with water and dried in vacuo. The product (1870 g) is a yellowish liquid (AV=158, SV=164, OHV=243).

The epoxystearic acid methyl ester was prepared by epoxidation of an oleic acid methyl ester with the following principal components in the fatty acid composition: oleic acid ($C_{18}$:1) 73% by weight, linoleic acid ($C_{18}$:2) 11% by weight, palmitoleic acid ($C_{16}$:1) 5% by weight, stearic acid ($C_{18}$:0) 2% by weight.

Example 2

Ring opening of epoxystearic acid methyl ester (technical) with diethylene glycol and release of the carboxylic acid 1019 g epoxystearic acid methyl ester (Ep.O= 4.71%) and 637 g diethylene glycol were heated with stirring to 90° C. in the presence of 0.45 g concentrated sulfuric acid. The initially exothermic reaction was terminated after 2 hours (Ep.O=0.03%). The catalyst was neutralized with 1.8 g 30% methanolic sodium methylate solution and the crude product was distilled in vacuo up to 210° C. (541 g distillate). A clear yellow liquid was obtained in this way (OHV=200, SV=146, IV= 11, AV=0.4).

1057 g of the ring opening product of epoxystearic acid methyl ester with diethylene glycol were saponified with 480 g 25% sodium hydroxide at 95° C. (reaction time 2 h). 420 g 35% sulfuric acid were then added at 60° C. and the organic phase was washed twice with water and dried in vacuo. The product (810 g) is a yellowish liquid (AV=145, SV=150, OHV=212).

Example 3

Ring opening of epoxystearic acid methyl ester (technical) with hexane-1,6-diol and release of the carboxylic acid 1019 g epoxystearic acid methyl ester (Ep.O=4.71%) and 709 g hexane-1,6-diol were heated with stirring to 90° C. in the presence of 0.75 g concentrated sulfuric acid. The initially exothermic reaction was terminated after 3 hours (Ep.O=0.03%). The catalyst was neutralized with 3.5 g 30% methanolic sodium methylate solution and the crude product was distilled in vacuo up to 210° C. (579 g distillate). A clear yellow liquid was obtained in this way (SV=147, IV=11, AV =0.4).

1015 g of the ring opening product of epoxystearic acid methyl ester with hexane-1,6-diol were saponified with 465 g 25% sodium hydroxide at 95° C. (reaction time 2 h). 407 g 35% sulfuric acid were then added at 60° C. and the organic phase was washed twice with water and dried in vacuo. The product (939 g) is a yellowish liquid (AV=144, SV=148, OHV=206).

Example 4

Ring opening of epoxystearic acid methyl ester (technical) with butane-1,4-diol and release of the carboxylic acid 1019 g epoxystearic acid methyl ester (Ep.O= 4.71%) and 541 g butane-1,4-diol were heated with stirring to 110° C. in the presence of 0.45 g concentrated sulfuric acid. The initially exothermic reaction was terminated after 1 hour (Ep.O=0.03%). The catalyst was neutralized with 2.0 g 30% methanolic sodium methylate solution and the crude product was distilled in vacuo up to 210° C. (506 g distillate). A clear yellow liquid was obtained in this way (OHV=233, SV=149, IV =7, AV=0.5).

977 g of the ring opening product of epoxystearic acid methyl ester with butane-1,4-diol were saponified with 513 g 25% sodium hydroxide at 95° C. (reaction time 2 h). 448 g 35% sulfuric acid were then added at 60° C. and the organic phase was washed twice with water and dried in vacuo. The product (906 g) is a yellowish liquid (AV=154, SV=154, OHV=242).

Example 5

Ring opening of epoxystearic acid methyl ester (technical) with polydiol 300 and release of the carboxylic acid 584 g epoxystearic acid methyl ester (Ep.O= 4.71%) and 516 g polydiol 300 were heated with stirring to 100° C. in the presence of 2.6 g concentrated sulfuric acid. The initially exothermic reaction was terminated after 2 hours (Ep.O= 0.1%) and the product was saponified with 339 g 25% sodium hydroxide at 98° C. (reaction time 2 h). After bleaching for 15 minutes with 10 ml 13% NaOCl solution, 346 g 35% sulfuric acid were added at 60° C. and the organic phase was washed twice with water and dried in vacuo. The product (637 g) is a yellowish wax (AV=140, SV=147, OHV=106).

Example 6

Ring opening of epoxystearic acid methyl ester (technical) with polydiol 600 and release of the carboxylic acid 408 g epoxystearic acid methyl ester (Ep.O= 4.71%) and 720 g polydiol 600 were heated with stirring to 100° C. in the presence of 4.2 g concentrated sulfuric acid. The initially exothermic reaction was terminated after 4 hours (Ep.O= 0.1%) and the product was saponified with 238 g 25% sodium hydroxide at 90° C. (reaction time 2 h). After bleaching for 15 minutes with 10 ml 13% NaOCl solution, 209 g 35% sulfuric acid were added at 60° C. and the organic phase was washed twice with water and dried in vacuo. The product is a yellowish wax (AV=121, SV=124, OHV=69).

Example 7

Ring opening of epoxy-NSf-fatty acid methyl ester with ethylene glycol and release of the carboxylic acid 693 g epoxy-NSf-fatty acid methyl ester (Ep.O= 4.62%) and 248 g ethylene glycol were heated with stirring to 100° C. in the presence of 0.2 g concentrated sulfuric acid. The initially exothermic reaction was terminated after 1 hour (Ep.O=0.1%). The catalyst acid was neutralized with 0.9 g 30% methanolic sodium methylate solution and the crude product was distilled in vacuo up to 200° C. (163 g distillate) and then saponified with 160 g 50% sodium hydroxide and 200 ml water at 90° C. (reaction time 3 h). 35% sulfuric acid was then added at 60° C. (up to pH 2) and the organic phase was washed twice with water and dried in vacuo. The product is a yellowish liquid (AV=150, SV=155, OHV= 238).

Ep.O=Epoxide oxygen content in % by weight

AV=Acid value

SV=Saponification value

OHV=OH value

Na=Sodium content

NSf=Fatty acid product from the oil of new sunflowers containing 85% by weight oleic acid.

The following dispersions were prepared:

| Raw Materials | Names of the dispersions (quantities in mol) | | | | | | | | |
|---|---|---|---|---|---|---|---|---|---|
| | A | B | C | D | E | F | G | H | I |
| Dihydroxyfatty acid | | | | | | | | | |
| of Example 1 | 0.5 | 0.7 | / | / | / | / | / | / | / |
| Example 2 | / | / | 0.5 | / | / | / | / | / | / |
| Example 3 | / | / | / | 0.6 | / | / | / | / | / |
| Example 4 | / | / | / | / | 0.6 | / | / | / | / |
| Example 5 | / | / | / | / | / | 0.5 | / | / | / |
| Example 6 | / | / | / | / | / | / | 0.4 | / | 0.1 |
| Example 7 | / | / | / | / | / | / | / | 0.6 | 0.4 |
| Ester 1 | / | / | / | 0.2 | 0.3 | / | / | / | / |
| PPG 1000 | 0.4 | / | 0.2 | 0.1 | / | / | 0.3 | / | 0.4 |
| PPG 425 | / | / | 0.1 | 0.1 | / | / | 0.1 | / | 0.1 |
| PPG 2000 | / | 0.2 | / | / | / | / | 0.1 | / | / |
| PTHF 1000 | 0.1 | / | / | / | / | / | / | 0.2 | / |
| PTHF 2000 | / | 0.1 | 0.2 | / | 0.1 | 0.5 | / | 0.2 | / |
| DMPA | / | / | / | / | / | / | 0.1 | / | / |
| Ethylenediamine | 0.2 | 0.1 | / | / | 0.3 | / | / | / | / |
| IPDI | 1.3 | 1.0 | / | 0.5 | 1.4 | 1.3 | / | 1.0 | / |
| TMXDI | / | / | 1.1 | 0.8 | / | / | 1.3 | / | / |
| $H_{12}$MDI | / | 0.3 | / | / | / | / | / | 0.3 | 1.1 |
| MDI | / | / | 0.2 | / | / | / | / | / | / |
| Triethylamine | 0.5 | / | / | 0.2 | 0.6 | / | / | 0.5 | 0.4 |
| NaOH | / | 0.6 | 0.5 | 0.3 | / | 0.5 | 0.5 | / | / |
| Solids content, % by weight | 40.9 | 39.8 | 39.2 | 37.6 | 36.9 | 42.0 | 35.1 | 43.0 | 34.9 |
| Acetone, % by weight | 10 | 10 | / | 8 | 10 | 10 | / | 12 | 18 |

(Ester 1 prepared from adipic acid, ethylene glycol and hexanediol - the latter in a ratio of 1:1; molecular weight 2000 calculated via the OH value)

Dispersions A, B, C, D, E, F, G, H and I were prepared by the acetone method at approx. 75° C., dispersions C and G being prepared at approx. 100° C. with no addition of solvent. Dispersion was commenced after the theoretical NCO value had been reached; chain extension with diamines was initiated immediately after dispersion by addition of the diamine.

The results of the adhesion measurements are set out in the following Table. The tensile shear strengths were measured on test specimens measuring 10×5×0.5 cm³ at a tear rate of 10 cm/min. The test specimens had been stored for 3 days at room temperature after bonding. The overlap of the test specimens measured 2 cm× 5 cm (bonded area). The test had been developed on the basis of DIN 53254.

| | Tensile shear strength in N/cm² | | | | | | | |
|---|---|---|---|---|---|---|---|---|
| | A | B | C | D | E | F | G | H | I |
| Wood/wood | 8.2 | 6.5 | 6.8 | 7.9 | 8.4 | 7.2 | 6.1 | 7.2 | 7.6 |

-continued

| | | | | | | | | | |
|---|---|---|---|---|---|---|---|---|---|
| Wood/PVC | 3.5 | 3.8 | 3.5 | 4.2 | 5.8 | 4.6 | 2.8 | 4.3 | 2.2 |
| Wood/ABS | 3.4 | 3.9 | 2.8 | 4.0 | 5.5 | 4.0 | 2.2 | 3.9 | 1.9 |
| Wood/Alu | 7.5 | 6.9 | 7.1 | 7.0 | 7.0 | 6.2 | 6.9 | 7.0 | 8.0 |

Wood: Beechwood
PVC: Polyvinyl chloride
ABS: Acrylonitrile/butadiene/stryene terpolymer
Alu: Aluminium
EDA: Ethylenediamine
IPDI: Isophorone diisocyanate
TEA: Triethyleneamine
PPG: Polypropylene glycol ⎫ The figures indicate
PTHF: Polytetrahydrofurandiol ⎬ the average molecular weight

We claim:

1. A process for the production of carboxyfunctional polyurethanes, said process comprising: reacting a mixture comprising;

a) an isocyanate component that is on average polyfunctional, b) a polyol component that is on average polyfunctional, c) a dihydroxyfatty acid component formed by ring opening of an epoxidized fatty acid containing 8 to 36 carbon atoms, for introducing ionizable carboxy function, said dihydroxyfatty acid component comprised of at least one dihydroxyfatty acid compound selected from the group consisting of dihydroxyfatty acids and dihydroxypolyfatty acids, wherein said dihydroxyfatty acid compound is free of substitution for a hydrogen on a carbon atom alpha to the carboxyl group and forms a homogenous single phase system with the polyol component.

2. A process as claimed in claim 1 wherein said dihydroxyfatty acid component is produced by ring opening of epoxidized monounsaturated fatty acids with water.

3. A process as claimed in claim 1 wherein said dihydroxyfatty acid component is produced by ring opening of epoxidized monounsaturated fatty acids with diols.

4. A process as claimed in claim 1 wherein said diol used for ring opening is selected from the group consisting of ethane-1,2-diol, butane-1,4-diol and hexane-1,6-diol.

5. A process as claimed in claim 1 wherein said diol used for ring opening is a compound selected from the group consisting of polyethylene glycol, polypropylene glycol and polytetrahydrofurandiol.

6. A process as claimed in claim 5 wherein said diol used for ring opening has a degree of polymerization of 2 to 20 units.

7. A process as claimed in claim 1 wherein said dihydroxyfatty acid component is produced from epoxidized monounsaturated fatty acids having a chain length of $C_{14}$ to $C_{26}$.

8. A process as claimed in claim 1 wherein said dihydroxyfatty acid component is produced from epoxidized monounsaturated fatty acids which are mixtures of natural fatty acids.

9. A process as claimed in claim 8 wherein said mixtures of natural fatty acid have a predominant content of oleic acid.

10. A process as claimed in claim 1 wherein the product produced by said process is self-dispersible in water.

11. A process as claimed in claim 1 wherein said mixture is further comprised of a chain-extending agent.

12. A process as claimed in claim 1 wherein more than 30% by weight of said isocyanate component consists of aliphatic isocyanates.

13. A process as claimed in claim 1 wherein at least most of said isocyanate component consists of aliphatic isocyanates.

14. A process as claimed in claim 1 wherein all of said isocyanate component consists of aliphatic isocyanates.

15. A process as claimed in claim 1 wherein the percentage content of reacted dihydroxyfatty acid component is selected such that the polyurethane produced by said reacting is self-dispersible in water.

16. A process as claimed in claim 1 wherein said polyol component and said dihydroxy fatty acid component are processed to form a homogeneous single-phase system before reaction with said isocyanate component.

17. A polyurethane produced by the process of claim 1.

18. An aqueous polyurethane dispersion comprising a polyurethane produced by the process of claim 1 and water.

19. An aqueous polyurethane dispersion as claimed in claim 17 wherein said dispersion has a solids content of 20% to 70% by weight.

20. An aqueous polyurethane dispersion as claimed in claim 17 wherein said dispersion has a solids content of 30% to 50% by weight.

21. The process of claim 1 wherein the dihydroxyfatty acid component is a liquid.

* * * * *